US005485354A

United States Patent [19]
Ciupke et al.

[11] Patent Number: 5,485,354
[45] Date of Patent: Jan. 16, 1996

[54] FLAT PANEL DISPLAY LIGHTING SYSTEM

[75] Inventors: Werner W. Ciupke; William F. Redmond; Richard E. DuNah, all of Sonoma County, Calif.

[73] Assignee: Precision Lamp, Inc., Cotati, Calif.

[21] Appl. No.: 119,706

[22] Filed: Sep. 9, 1993

[51] Int. Cl.$^6$ ........................................ F21V 8/00
[52] U.S. Cl. .................... 362/31; 362/26; 362/330; 359/49
[58] Field of Search ...................... 359/40, 41, 48, 359/49, 50, 64, 70; 362/26, 27, 31, 327, 328, 330

[56] References Cited

U.S. PATENT DOCUMENTS

| | | | |
|---|---|---|---|
| 2,646,637 | 7/1953 | Nierenberg et al. | 362/31 |
| 4,011,001 | 3/1977 | Moriya | 359/49 |
| 4,142,781 | 3/1979 | Baur et al. | 359/49 |
| 4,257,084 | 3/1981 | Reynolds | 362/31 |
| 4,277,817 | 7/1981 | Hehr | 362/31 |
| 4,323,951 | 4/1982 | Pasco | 362/27 |
| 4,528,617 | 7/1985 | Blackington | 362/32 |
| 4,659,183 | 4/1987 | Suzawa | 359/48 |
| 4,706,173 | 11/1987 | Hamada et al. | 362/341 |
| 4,799,137 | 1/1989 | Aho | 362/309 |
| 4,883,333 | 11/1989 | Yanez | 362/32 |
| 4,909,604 | 3/1990 | Kobayashi et al. | 362/31 |
| 4,918,578 | 4/1990 | Thompson | 362/31 |
| 4,984,144 | 1/1991 | Cobb et al. | 362/339 |
| 5,046,826 | 9/1991 | Iwamoto et al. | 362/31 |
| 5,050,946 | 9/1991 | Hathaway et al. | 385/33 |
| 5,079,675 | 1/1992 | Nakayama | 362/31 |
| 5,128,842 | 7/1992 | Kenmochi | 362/95 |
| 5,339,179 | 8/1994 | Rudisill et al. | 359/49 |

FOREIGN PATENT DOCUMENTS

| | | | |
|---|---|---|---|
| 3825-436-A | 3/1989 | Germany | 350/96.10 |
| 123823 | 7/1985 | Japan | 359/49 |
| 62-73206 | 4/1987 | Japan | 350/96.10 |
| 63-287803 | 11/1988 | Japan | 350/96.10 |
| 63-271301 | 11/1988 | Japan | 350/96.10 |
| 5-107542 | 4/1993 | Japan | 359/48 |

*Primary Examiner*—Ira S. Lazarus
*Assistant Examiner*—Alan B. Cariaso
*Attorney, Agent, or Firm*—Flehr, Hohbach, Test, Albritton & Herbert

[57] ABSTRACT

A flat panel display lighting system is disclosed wherein a thin, flat light guide has two spaced major surfaces with light introduced into one edge of the guide. Light is extracted from the light guide by the first facets in a plurality of parallel microgrooves disposed to intersect and transmit the light introduced into the light guide and reflected away from the major surface by reflection from second microgroove facets. A liquid crystal display is placed adjacent to the light guide to be backlit or frontlit.

17 Claims, 3 Drawing Sheets

U.S. Patent  Jan. 16, 1996  Sheet 1 of 3  5,485,354
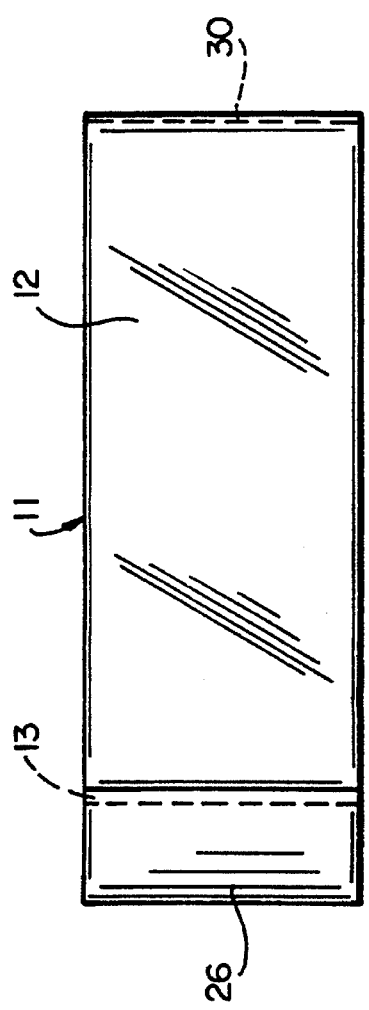
FIG_1
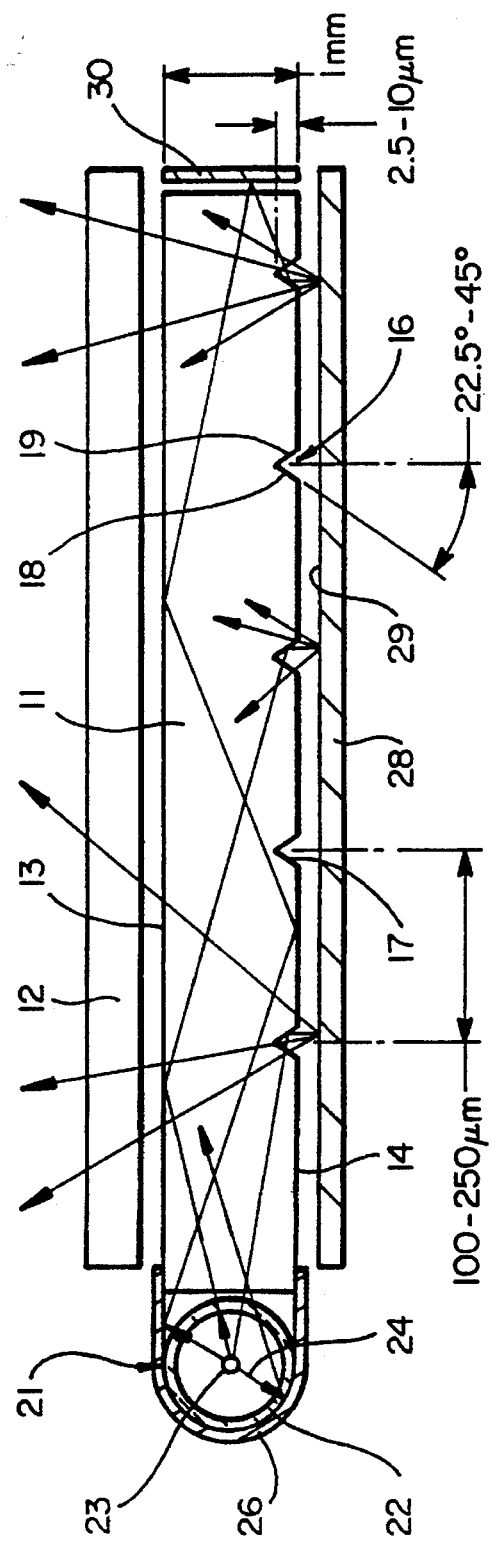
FIG_2

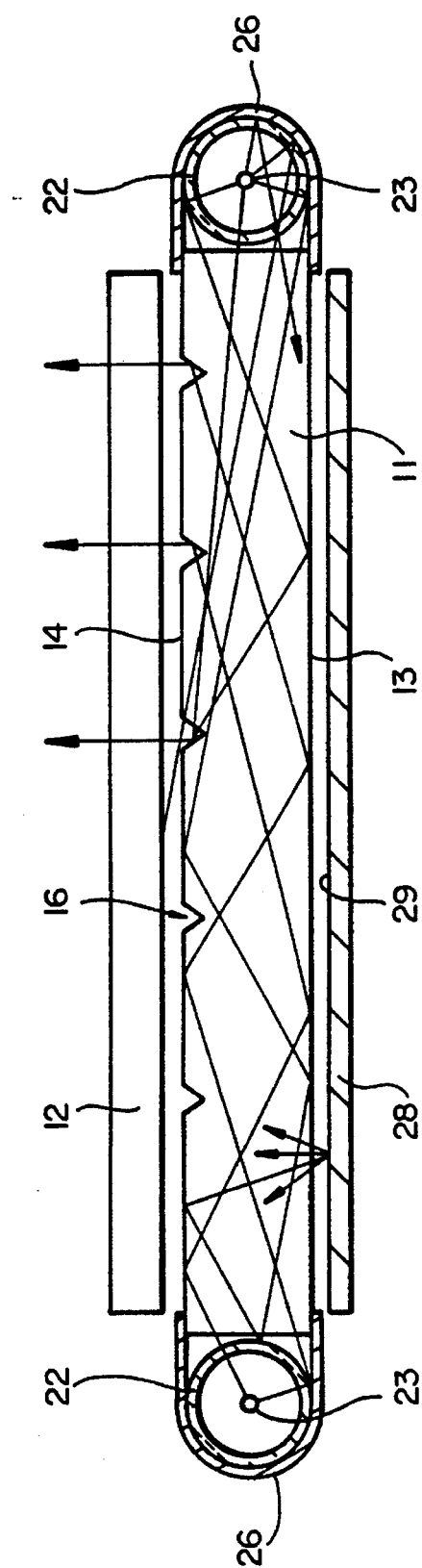
FIG_3
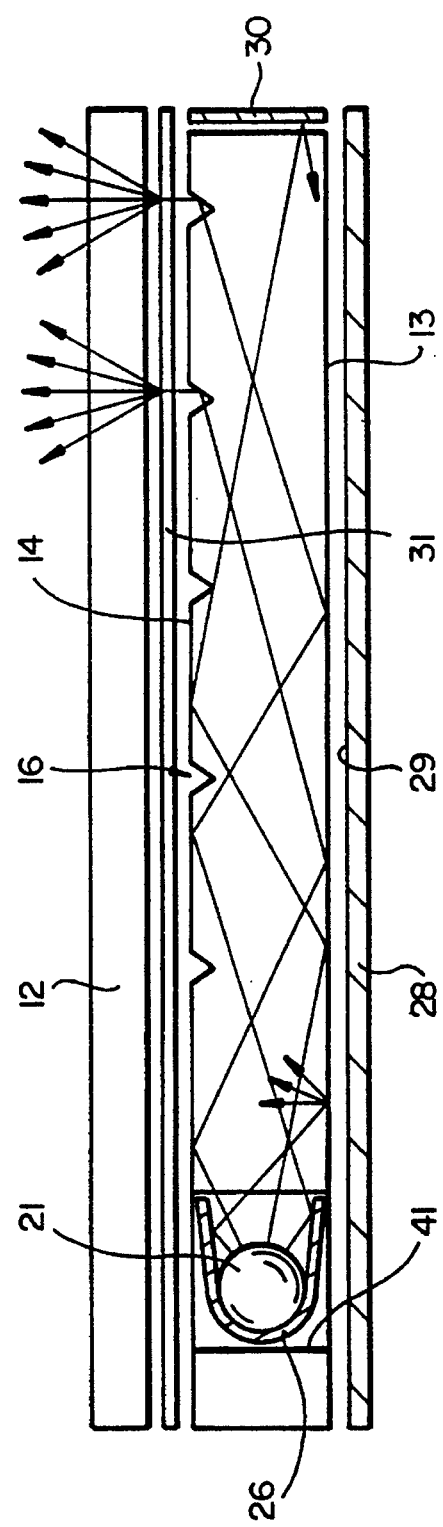
FIG_4

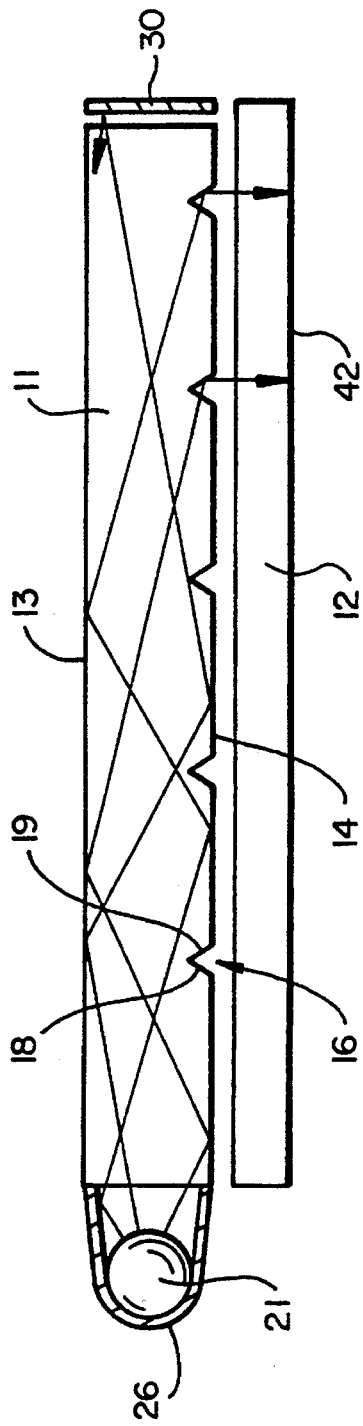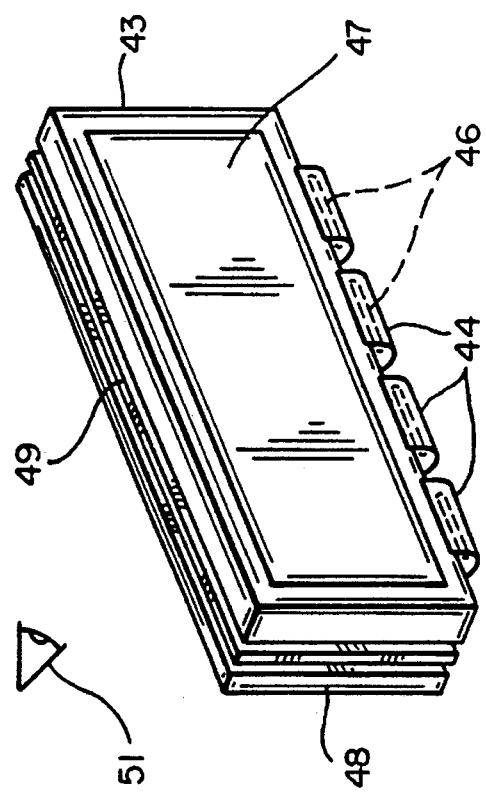
FIG_5
FIG_6

FLAT PANEL DISPLAY LIGHTING SYSTEM

BRIEF SUMMARY OF THE INVENTION

This invention relates generally to a lighting system for illuminating flat panel displays such as liquid crystal displays, and more particularly, to a system employing a thin flat light guide with microgrooves formed on one major surface for extracting and externally reflecting light introduced into the light guide.

BACKGROUND OF THE INVENTION

Lighting systems for illuminating liquid crystal displays employing light guides with edge lit end surfaces are known. These large area lighting systems generally do not have a uniform thickness, which is undesirable in many applications, such as back-lighting of liquid crystal displays (LCDs) for pagers, hand-held computers, organizers and the like. Examples of prior art light sources are described in the following patents:

U.S. Pat. No. 4,706,173 discloses a light reflecting apparatus that uses a lamp, probably a fluorescent lamp, with light impinging on a series of exterior reflective surfaces which reflect the light into an associated display.

U.S. Pat. No. 4,277,817 discloses two embodiments of a wedge-shaped body with a microgroove surface for emitting light from the grooved surface. The light is introduced in a direction that is generally parallel to the grooves.

U.S. Pat. No. 4,257,084 discloses a display that reflects light off an angled surface to strike a diffusing surface which has prismatic serration to extract the light.

U.S. Pat. No. 4,323,951 discloses a display having generally laminar light transmissive layers, one of which has a roughened back surface whereby light will be transmitted through a front surface of the laminar unit.

U.S. Pat. No. 4,528,617 discloses a light distribution apparatus that uses a transparent double wedge-shaped member having first internally reflecting surfaces to reflect a curtain of light to a second surface which has internally reflecting surfaces which reflect the light to an opposite surface for illuminating a generally rectangular area whereby to backlight an LCD display.

U.S. Pat. No. 5,050,946 discloses a light pipe that has a planar front surface for back-lighting LCDs. Light is injected into the light pipe from the ends. The back surface has a series of planar portions parallel to the front surface connected by facets, which are angled so that the injected light reflects internally off the facets through the front surface. A reflector having a planar, highly reflective, highly scattering surface or a sawtoothed or grooved reflecting surface is placed adjacent to facets.

U.S. Pat. No. 5,126,882 discloses a light pipe in which light emitted from a surface strikes a prism member which causes the light to be directed in a predetermined direction.

In copending application Ser. No. 08/095,753 filed Jul. 20, 1993, a flat panel display lighting system is disclosed wherein a thin, flat light guide has two spaced major surfaces with light introduced into one edge of the guide. Light is extracted from the light guide by being internally reflected from facets of a plurality of v-shaped microgrooves formed in one major surface.

OBJECTS AND SUMMARY OF THE INVENTION

It is an object of this invention to provide a thin, uniform thickness large area lighting system for lighting flat displays, particularly liquid crystal displays.

It is another object of the invention to provide a thin, uniform thickness large area lighting system employing a light guide with means for extracting light introduced into the edge of a light guide from a major surface and externally reflecting the light to provide substantially uniform light projecting from said major surface.

It is a further object to provide a thin, uniform thickness large area lighting system for front-lighting liquid crystal displays.

It is a further object to provide a lighting system having an injection-moldable, low cost light guide.

The foregoing and other objects are achieved by a thin, flat, transparent light guide having a first planar major surface and a second parallel major surface with a plurality of closely spaced microgrooves whose surfaces extract light and then externally reflect the light which is introduced into the light guide in a direction substantially perpendicular to the direction of the axis of the grooves outward from the second major surface.

BRIEF DESCRIPTION OF THE DRAWINGS

The foregoing and other object of the invention will be more fully understood from the following description, read in connection with the accompanying drawings, where:

FIG. 1 is a plan view of a back light LCD illuminated by a light pipe in accordance with one embodiment of the invention.

FIG. 2 is a greatly enlarged cross-sectional view of the embodiment of FIG. 1.

FIG. 3 is an enlarged cross-sectional view of another embodiment of a backlighting system incorporating two light sources.

FIG. 4 is a greatly enlarged cross-sectional view of a large area lighting system in accordance with another embodiment of the invention.

FIG. 5 is an enlarged cross-sectional view of a large area lighting system in accordance with the invention, which is front-lighting an LCD.

FIG. 6 shows a backlit transmissive LCD assembly in accordance with another embodiment of the invention.

DESCRIPTION OF PREFERRED EMBODIMENT

FIGS. 1 and 2 show a light pipe or guide 11 used for backlighting a liquid crystal display (LCD) 12. The light pipe includes one planar surface 13 and an opposite light extracting and reflecting surface 14 created by facets 16 formed by grooves 17. The v-shaped grooves 17 extending across the surface 14 having a longitudinal axis. FIG. 2 shows that typical v-groove depths are 2.5–10 µm, spacing between v-grooves is 100–250 µm, and the thickness of the light pipe is 1 mm. As will become apparent, the spacing between grooves may be varied along the length of the light pipe to provide improved uniformity of the light along the length of the light guide extracted from the light guide by one surface 18 of the grooves and externally reflected away from the light guide by the cooperating surface 19 of the grooves. The light pipe has v-grooves whose facets make an angle with respect to a direction perpendicular to the light pipe, which is typically 22.5–45°. The direction of the light traveling in the thin light pipe is such that the light strikes the facets at an angle which passes the light where it leaves the light pipe and is reflected by the adjacent facet 19. In one flat panel display lighting system, the thickness of the light pipe was 1 mm, which matched the dimensions of the miniature incandescent light sources which edge-lit the light guide. In general, we have found that the light guide or pipe provides the best lighting efficiency when it has a thickness the same or greater than the dimension of the light source and the groove/spacing is about 1/10 the thickness of the light pipe. A typical light source 21 includes a cylindrical envelope 22 which houses a co-axial filament 23. The filament radiates light in all directions as indicated by the arrows 24. A U-shaped reflector 26, which may comprise a thin sheet of reflective material, encloses the lamp and reflects the energy into the light pipe in a plurality of directions. Preferably, the space between the incandescent lamp, the light pipe and the reflector is filled with a transparent, flexible, refractive index matching material which holds the lamp and cushions it from any shock and efficiently couples the light from the source into the light pipe. The index matching material may be tinted to provide a colored lighting system. Alternatively, a colored lighting display may be achieved by having a colored U-shaped reflector 26 or a tinted light guide 11. The light, which is directed in a direction generally perpendicular the longitudinal axis of the v-grooves into the end of the light pipe, is transmitted by the surfaces 18 of the v-grooves, or facets, and is reflected off the adjacent surfaces 19 outwardly, away from the major surface 14, as shown generally by the rays 27. A reflector 38 with reflecting surface 29 is placed adjacent the faceted surface and reflects the light from the major surface back into the light pipe and toward the surface 13, where it emerges to backlight the display 12. The end of the light pipe is provided with a reflector 38 which reflects any light traveling through the light pipe back into the light pipe to further increase the efficiency of conversion of light from the incandescent source for backlighting the LCD. As is apparent, light rays eventually strike the facets and pass through one surface of the grooves, and are reflected by the other surface.

FIG. 3 shows another embodiment of the invention in which the reflecting surface 29 is placed adjacent to the planar surface 13 of the light pipe 11 and the LCD 12 receives light reflected from the grooved surfaces 14. The light that escapes from the planar surface 13 is reflected back into and through the light pipe by the back-reflecting surface 29, as indicated. In other respects, the construction of the embodiment of FIG. 3 is identical to that of FIGS. 1 and 2, and like reference numbers have been applied to like parts. In instances where more light is required, light sources may be placed at each end of the light pipe, as illustrated in FIG. 3.

In FIG. 4, the light pipe is provided with an opening 41 which receives the reflector 26 and the light source 21. The volume within the reflector is filled with a transparent, resilient, refractive index matching material to protect the light source against shock and efficiently couple the light into the guide. The index matching material may be tinted if a colored lighting system is desired. A diffuser or brightness enhancing film 31 receives the emitted light and diffuses the light so that light of relatively uniform intensity strikes the back of the LCD 12. In instances where the LCD 12 is provided with a suitable transflective coating, the diffuser may be eliminated and the LCD placed directly on the planar surface, as in FIG. 2. We have also found that for backlit displays, the illumination can be improved if the LCD transflective back-coating is removed to produce a transmissive LCD and a light diffuser is placed between the light pipe and the LCD. In other respects, the lighting system shown in FIG. 4 operates similar to that shown in FIG. 3, and like reference numbers have been applied to like parts.

We have found that efficiency of the lighting of certain LCDs can be improved if the LCD is illuminated from the front. This is illustrated in FIG. 5, where the LCD 12 is placed adjacent to the grooved surface 14, and the light exiting the light guide and reflected by the facets strikes the LCD 12 directly. In this instance the LCD, which has a totally reflective back surface 42, is viewed through the thin transparent light pipe 11. Operation of the light pipe to extract light is as described above and like reference numerals have been applied to like parts.

The display lighting system shown in the figures includes a long, narrow light pipe or light guide with a light source at one or both ends. It is, of course, apparent that the light guide may have different shapes and that the source of light may be located along an edge of the guide rather than the end, with the longitudinal axis of the v-grooves extending generally perpendicular to the light source. The light source may include a plurality of incandescent light sources, glow discharge sources, or other types of light sources which direct light into the light guide or pipe in a direction generally perpendicular to the axis of the v-grooves. An assembly of this type is shown in FIG. 6.

The assembly of FIG. 6 includes a light guide 43 of the type described above, which is lit by a plurality of spaced light sources 44 including incandescent lamps 46. The light guide includes a back surface reflector 47. A transmissive LCD 48 is placed adjacent to the front surface of the light guide with a diffuser 49 placed between the light guide 43 and the LCD 48. The assembly operates as described above with reference to FIG. 4. The LCD is therefore backlit and viewed from the front as indicated at 51.

What is claimed:

1. A thin, large-area lighting system comprising:

a thin, transparent, rectangular light guide having first and second parallel major surfaces, said first major surface having a plurality of v-shaped parallel microgrooves extending across said first major surface and a plurality of planar surface portions extending between said microgrooves, said microgrooves having a longitudinal axis;

means for introducing light into said light guide from one edge in a direction generally perpendicular to said longitudinal axis of said microgrooves, said microgrooves each having a pair of adjacent surfaces which form an angle with respect to the first major surface which, when taken together with the index of refraction of the transparent light guide material, externally reflect light through said first major surface, one of said adjacent surfaces being oriented to transmit substantially all the light within said light guide striking said one of said adjacent surfaces outwardly through said one of said adjacent surfaces and across said microgroove toward the other of said adjacent surfaces, said other of said adjacent surfaces being oriented to externally reflect the transmitted light away from the first major surface, said planar surface portions being configured for internally reflecting light striking said planar surface portions toward said second major surface for transmitting light along said light guide.

2. A thin, large-area lighting system as in claim 1 including reflective means adjacent to said first major surface and spaced from said adjacent surfaces of said microgrooves for reflecting the light reflected away from the first major surface by said other of said adjacent surfaces back into the light guide and toward said second major surface.

3. A thin, large-area lighting system as in claim 1 with reflecting means adjacent to said second major surface for reflecting light toward said first major surface.

4. A thin large area lighting system as in claims 1, 2 or 3 wherein the angle formed by said microgroove surfaces is between 22.5–45 degrees with respect to a direction perpendicular to the first major surface.

5. A lighting system as in claim 4 wherein the microgrooves are equally spaced.

6. A thin, large-area lighting system as in claim 1 in which the light guide material is tinted for the desired light color.

7. A lighting system as in claims 1, 2 or 3 wherein the thickness of the panel is approximately 1 mm, the depth of the microgrooves is between 2.5–10 μm, the spacing between microgrooves is between 100–250 μm, and the angle of the microgrooves with respect to a direction perpendicular to the first major surface is between 22.5 and 45 degrees.

8. A lighting system as in claims 1, 2 or 3 wherein said means for introducing light into said light guide comprises:

an elongated, incandescent lamp adjacent to said one edge, a reflector extending from the edge of the light guide around said incandescent lamp to reflect light from said lamp into the light guide, and a flexible transparent material substantially filling the space between said lamp, said reflector and the edge of said light guide serving to cushion the lamp against shock and efficiently couple the light into the light guide.

9. A lighting display as in claim 8 wherein the flexible transparent material is tinted to provide colored light.

10. An illuminated LCD system including a thin, large-area lighting system comprising:

a thin, transparent, rectangular light guide having first and second parallel major surfaces, said first major surface having a plurality of v-shaped parallel microgrooves extending across said first major surface, said microgrooves having a longitudinal axis;

means for introducing light into said light guide from one edge in a direction generally perpendicular to said axis of said microgrooves;

said microgrooves each having a pair of adjacent surfaces which form an angle with respect to the first major surface which, when taken together with the index of refraction of the transparent light guide material, transmit substantially all the light within said light guide striking one of said adjacent surfaces through said one of said adjacent surfaces toward the other of said adjacent surfaces, said other of said adjacent surfaces reflecting the transmitted light away from the first major surface; and a front-lit LCD having a front surface and a reflecting back surface which reflects light introduced into said front surface to display information in the display, said LCD having said front surface in contact with said first major surface, whereby the display is illuminated from the front and the display information is viewed through the light guide.

11. An illuminated LCD system comprising:

a thin, transparent, rectangular light guide having first and second parallel major surfaces, said first major surface having a plurality of v-shaped parallel microgrooves extending across said first major surface and a plurality of planar surface portions extending between said microgrooves, said microgrooves having a longitudinal axis;

means for introducing light into said light guide from one edge in a direction generally perpendicular to said longitudinal axis of said microgrooves;

said microgrooves each having adjacent first and second microgroove surfaces which form an angle with respect to said first major surface which, when taken together with the index of refraction of the transparent light guide material, externally reflect light through said first major surface of said light guide, said first microgroove surface being configured to transmit substantially all the light within said light guide striking said first microgroove surface outwardly through said first microgroove surface and across said microgrooves toward said second microgroove surface, said second microgroove surface being configured to externally reflect the transmitted light away from the first major surface;

said planar surface portions being configured for internally reflecting light striking said planar surface portions toward said second major surface for transmitting light along said light guide, and a backlit LCD having a front surface and a back surface placed with said back surface adjacent to said first major surface.

12. An illuminated LCD system as in claim 11 wherein a diffuser is placed between said first major surface and said LCD.

13. An illuminated LCD system as in claim 11 wherein the LCD is transmissive.

14. An LCD system as in claim 11 including reflective means adjacent to said second major surface for reflecting light which leaves the light guide back into the light guide and toward said second major surface to enhance the emitted light intensity.

15. An illuminated LCD system comprising:

a thin, transparent, rectangular light guide having first and second parallel major surfaces, said first major surface having a plurality of v-shaped parallel microgrooves extending across said first major surface and a plurality of planar surface portions extending between said microgrooves, said microgrooves having a longitudinal axis;

means for introducing light into said light guide from one edge in a direction generally perpendicular to said longitudinal axis of said microgrooves;

said microgrooves each having adjacent first and second microgroove surfaces which form an angle with respect to said first major surface which, when taken together with the index of refraction of the transparent light guide material, externally reflect light through said first major surface, said first microgroove surface being oriented to transmit substantially all the light within said light guide striking said first microgroove surfaces outwardly through said first microgroove surfaces and across said microgrooves toward said second microgroove surfaces, said second microgroove surfaces being oriented to externally reflect the transmitted light away from the first major surface;

said planar surface portions being configured for internally reflecting light striking said planar surface portions toward said second major surface for transmitting light along said light guide;

a backlit LCD having a front surface and a back surface placed with said back surface adjacent to said second major surface; and reflecting means adjacent to said first major surface and spaced from said first and second microgroove surfaces for reflecting light toward said second major surface where the reflected light illuminates the LCD.

16. An illuminated LCD system as in claim 15 wherein a diffuser is placed between said second major surface and said LCD.

17. An illuminated LCD system as in claim 16 wherein the LCD is transmissive.

* * * * *